United States Patent [19]
Davis

[11] 3,733,110
[45] May 15, 1973

[54] MULTI-MATERIAL FILAMENT WOVEN CAGE

[75] Inventor: Paul B. Davis, Sinclairville, N.Y.

[73] Assignee: TRW Inc., Cleveland, Ohio

[22] Filed: Apr. 17, 1972

[21] Appl. No.: 244,535

[52] U.S. Cl. ................................................. 308/217
[51] Int. Cl. ........................................... F16c 33/46
[58] Field of Search ............................ 308/201, 217

[56] References Cited
UNITED STATES PATENTS
3,472,567  10/1969  Johnson ............................. 308/201

Primary Examiner—Charles J. Myhre
Assistant Examiner—Frank Susko
Attorney—Benjamin H. Sherman, et al.

[57] ABSTRACT

A bearing cage and a method for manufacturing a cage wherein the cage consists of a plurality of circumferentially spaced radially directed cylindrical or rectangular pockets for receipt of roller elements, each pocket having at least a portion of its walls defined by a wound filament of a first material and the cage being defined by a wound filament of a second material.

11 Claims, 7 Drawing Figures

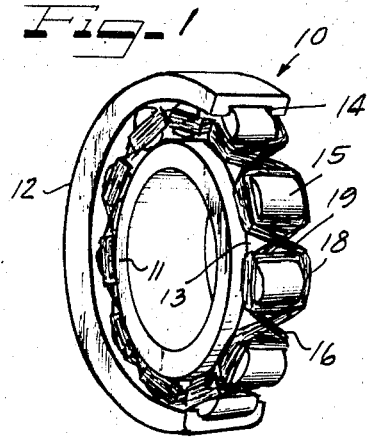
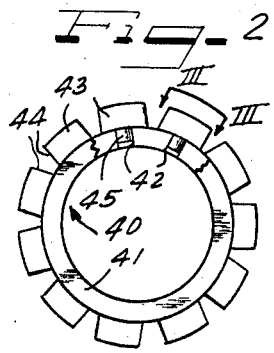
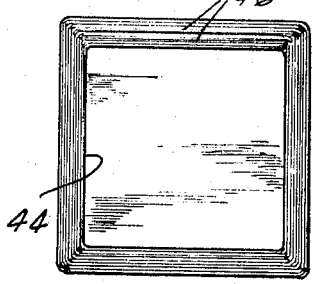
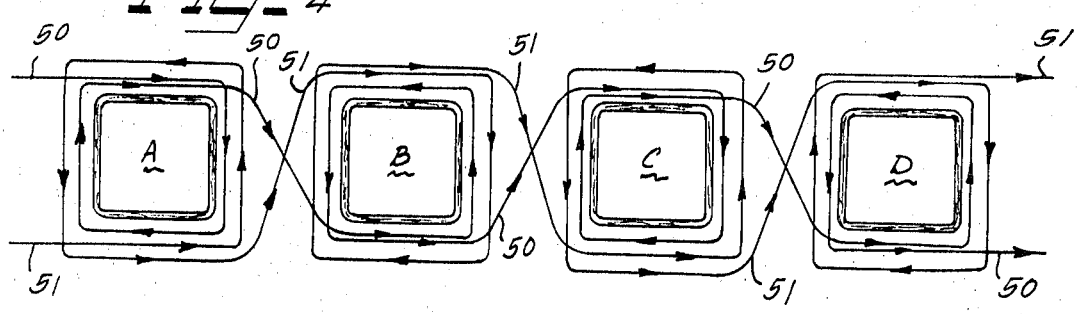
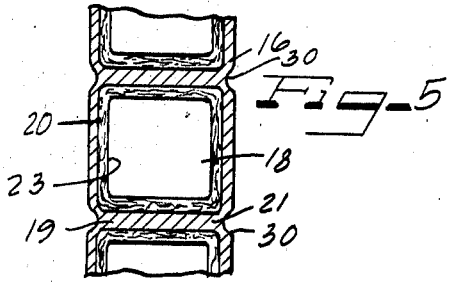
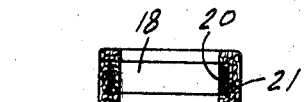
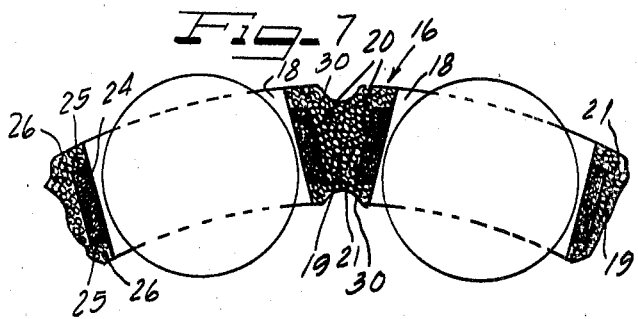
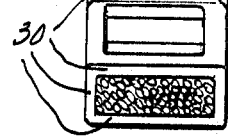

MULTI-MATERIAL FILAMENT WOVEN CAGE

BACKGROUND OF THE INVENTION

1. Field of the Invention

This invention relates to anti-friction bearing assemblies and more particularly to a roller element retaining and separating cage for such assemblies.

2. Prior Art

Many anti-friction bearing assemblies incorporating either ball or roller bearings use an element-separating cage. The cage, normally composed of sheet metal or carved phenolic resins or the like generally comprises a ring having an axial width with openings therein defining pockets for receipt of the anti-friction elements. The cage is interposed between the inner and outer race rings of the bearing assembly and functions to keep the anti-friction elements from bunching up within the assembly and from contacting one another. The cage rotates in the assembly as the anti-friction elements roll.

U.S. Pat. No. 3,472,567 to John H. Johnson, issued Oct. 14, 1969, illustrates a new type of bearing cage. The cage is formed from a continuous filament or a plurality of filaments which are wrapped in such a manner as to define the cage. The filaments are thereafter bonded into fixed ring and pocket shape.

Such wound bearing cages have numerous advantages over prior art solid and multi-piece cages. Further, with the recent development of different filaments including metallic and artificial plastic filaments, the cage can be made of a wide range of materials. Such materials for individual cages can be selected for desired properties.

However, certain installations emphasize the requirement of materials having given properties for defining the cage and particularly those parts of the cage subject to contact by the rolling elements. These materials are not always the ideal material for formation of the cage from other criteria bases. It would, therefore, be advantageous if a method were devised whereby a wound cage could be constructed which would provide individual pockets constructed of the best material for roller element contact or of the strongest material for pocket shaped definition, depending upon the criteria chosen, but which would also provide a cage constructed of the best material for the construction of the cage as a whole. Up until now, it has not been possible to produce a woven retainer cage constructed of two materials, each material being predominant in different areas of the cage.

SUMMARY

This invention provides a solution to the above problems by providing a woven cage wherein each individual pocket is first defined from a first woven material and the cage is thereafter defined from a second woven material. In the preferred embodiment, this is accomplished by creating a plurality of pockets, each individually woven from a strand or strands and thereafter connecting each of the individual pockets by a continuous wind to form the cage.

It is therefore an object of this invention to provide a dual material woven anti-friction element retainer cage.

It is another object of this invention to provide a filament woven retainer cage having individual pockets for receipt of the anti-friction elements, the pockets each having at least a portion of its walls defined by a material different than the cage-defining material.

It is a further object of this invention to provide a method of manufacturing a filament-wound bearing retainer cage by first winding a filament individually in a configuration to define individual pockets having substantially radial walls and open radial ends and then winding a continuous filament or filaments around said pockets and between a plurality of circumferentially spaced pockets to define a ring of pockets and thereafter bonding said filaments into fixed ring and pocket shape.

It is a further object of this invention to provide a method of manufacturing a filament-wound bearing cage constructed of differing materials which comprises the steps of providing a fixture with members thereon having an outer surface defining a pocket shape for receipt of an anti-friction element, winding a filament around said member to define a pocket having a hollow interior, and winding a separate and different material filament around a plurality of the defined pockets, fixing the defined pockets in circumferential spaced relation with open radially inner and outer ends and thereafter bonding the filaments into fixed ring and pocket shape.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a perspective view partially in section of an anti-friction bearing assembly equipped with the cage of this invention;

FIG. 2 is a plan view partially in section of a fixture which can be used to form the detainer cage of this invention;

FIG. 3 is a plan view as indicated by the lines III—III of FIG. 2, illustrating a portion of the fixture as wrapped with a first filament;

FIG. 4 is a diagrammatic view illustrating a method of wrapping a second filament around pockets formed by the first filament;

FIG. 5 is a fragmentary diagrammatic sectional view of a portion of a completed retainer cage according to this invention;

FIG. 6 is a cross-sectional diagrammatic view of a retainer cage constructed according to the teachings of this invention; and FIG. 7 is a fragmentary cross-sectional view taken along the circumference on a radial cut of a cage constructed according to the teachings of this invention.

DESCRIPTION OF THE PREFERRED EMBODIMENTS

The drawings illustrate a cage and method of constructing the cage wherein the cage is designed to receive and separate roller bearings. It is, however, to be understood that a cage with circular pockets can be constructed to receive ball bearings, and that further, the cage could be tapered to receive tapered roller bearings if desired. The method of this invention incorporates principles first taught in U. S. Pat. No. 3,472,567, issued Oct. 14, 1969 to John H. Johnson, and the teachings of that patent are herein specifically incorporated by reference, including the teachings of possible filament materials and binders such as resins and the like.

FIG. 1 is a perspective view of an anti-friction bearing assembly 10 composed of inner 11 and outer 12 race rings, each of which has raceways 13 and 14 therein. Rollers 15 are received between the race rings in the grooves 13 and 14 to provide relative rotatability to the rings. A cage structure 16 is also received intermediate the race rings 11 and 12. The cage structure 16 comprises a ring of circumferentially spaced pockets, each pocket receiving a roller 15. The function of the cage is to equally space the rolling elements around the race rings and to prevent the elements from rubbing against each other. In this, the cage acts as a separator. Further, in some embodiments, the cage may have a contour to the inner walls of the pockets to retain the rolling elements from drop-out in either a radially inwardly, a radially outwardly, or both directions. In such instances, the cage is generally described as a retainer. This invention is directed both to separator and separator-retainer cages.

The cage 16 consists of a plurality of circumferentially spaced pocket portions 18 interconnected by cross-over portions 19. The pocket portions are illustrated as being rectangular in pocket-defined shape for the receipt of roller bearings. However, cylindrical or other haped pockets may be provided to confine other types of anti-friction elements.

In accordance with prior-known teachings, the cage is constructed of a wound filament which is wound a plurality of times circumferentially around the cage area to provide a plurality of superimposed filaments which are thereafter bound together by a bonding technique. It is to be understood that the filament may be a mono-filament or a stranded filament and the bonding technique may include fusion of the filament material itself, fusion of bonding materials, cement, thermal or catalyst set bonding materials or, in general, any type of bond, which will lock the strands together into fixed shape. Bonding agents or methods which allow a degree of flexibility to the resultant cage are desirable.

The central idea of this invention is best illustrated in FIGS. 5, 6 and 7, wherein it is shown that the cage 16 consists of a plurality of circumferentially spaced pockets 18 first defined by a wound filament of a first material 20, the cage being defined by a wound filament of a second material 21.

As illustrated, the first material 20 is wound circumferentially to form the individual pockets 18, leaving open the inner and outer diameters of the pockets. Thus, the first material 20 comprises a band having an inner shape 23 in conformity with the shape of the pocket (rectangular as illustrated for roller bearings). The bands 24 have a radial height less than the height of the finished cage whereby the filament of the second material 21 overlies the radially inner and outer ends 25 of the bands 24 with an outer cage portion 26.

The second material 21 therefore finishes the definition of the individual pockets 18 and forms the cross-over portions 19 which connect the individual pockets 18 into a ring configuation. As is diagrammatically illustrated by the reduced thickness portions 30, the cross-over sections interconnecting the individual pockets are generally of a dimension less than the outer dimensions of the pocket areas. The specific dimensions of the crossover portions differ with the method of winding the ring as hereinafter described.

The differences in material between the first material filament and the second material filament 21 can vary according to the criteria chosen in selecting the material. As a specific example, where it is desirable to line the pockets with a minimum friction material while retaining a more flexible and higher-strength material for the formation of the cage itself, the first material bands 24 may be constructed of a graphite filament while the cage itself may be formed of a fibrous glass filament. In such a situation, the binding materials for the filaments may include polyester resins, epoxy resins, silicon resins, polymers etc. Where the filament material takes the form of a metal wire, the wound strand can be fused together at induction-produced elevated temperatures. Additionally, metal and ceramic spring techniques may be used to bond the filaments. A feature of this invention allows the use of different bonding techniques for the different first and second materials. Therefore, the bonding agent or technique used for the bands 24 may be chosen on the basis of criteria different from the bonding agent or technique chosen for the bonding of the second material. Thus, for example, where high heat and friction loss resistance is important in the immediate pocket defining area, the first material could be bonded together by a bonding agent chosen for high heat resistance such as, for example, a polyimide resin. Thereafter, the second material could be bonded together by a material chosen for high strength at lower temperatures such as by way of example, an epoxy resin.

Other reasons for a choice of differing materials also exist and a catalog of all possible reasons and choices is not possible. As a further example, where it is desired that the pockets have an absolute fixed shape in a flexible cage, the pockets themselves could be formed of a fused metal filament such as, by way of example, stainless steel bonded by heat fusion and the cage could be constructed of a more flexible material such as by way of example, nylon filament bonded with a resin binder. Thus, the structural rigidity of the fused metal filament will result in a shape defined pocket while the flexibility of the nylon or like material will result in a flexible cage of rigid pockets.

FIGS. 2, 3 and 4 illustrate a fixture 40 and a method of manufacture of the above-described cage. The fixture 40 has a circular disk 41 with a plurality of equally spaced radial holes 42 around the periphery thereof. Winding heads 43 have cylindrical stems 45 received in the holes 42 in snug but movable relation. Each head 43 has a rectangular periphery 44 sized to form the pocket 18 for the cage 16. In producing a cage for ball bearings, the periphery 44 would be circular or cylindrical. In producing retainer cages, the periphery 44 would be tapered, having a reduced radially inner section or a reduced radially outer section or an arcuate curve with both reduced inner and outer sections. In the latter instance, the heads may be constructed in an expandable manner whereby they can be contracted to release the individual pockets.

The individual pockets are formed first by a wrapping of the first material as illustrated in FIG. 3, wherein the individual strands 46 of the first material are wrapped around the periphery 44 of each individual head 43. A separate strand may be used for each head, or a continuous wrapping technique wherein each head is wrapped a plurality of times to build up the band and then the filament is passed to the next head to wrap it a plurality of times to build up a second band may be used. In any event, each head is wrapped with the first material a plurality of times to build up a band having the desired depth and height.

Thereafter, the resultant bands may be subjected to a bonding operation, either by setting of the binding agent or by subjecting the strands, if metallic, to a fusion process. Alternatively, the individual bands can be set at a later time in a common treatment with the setting of the second material.

As illustrated by FIG. 4, the second material is then wound around the individual pocket bands to form the ring. Numerous methods of winding illustrated, both fixture winding on the fixture of FIG. 2 and in situ winding, are disclosed in the aforementioned U.S. Pat. No. 3,472,567, and can be used in this invention. FIG. 4 illustrates one method wherein four pockets A through D are illustrated. Two strands 50 and 51 of filament are passed entirely around each pocket and then crossed over to the next pocket, beginning the wrapping of that pocket on the opposite side. Thus, the filament 50 begins on the top side of pocket A and is wrapped entirely around the pocket, terminating on the top side. The filament 50 then passes to the bottom side of the pocket B, wraps entirely around pocket B and then passes to the top of pocket C, etc. Filament 51 is illustrated beginning at the bottom of pocket A, passing entirely therearound and then crossing over to the top of pocket B, etc. If it is considered that pocket D represents schematically the start of another pass through pockets A, B and C, whereby pocket D will be yet another view of pocket A, then filaments 50 and 51 can be considered as being a single filament, with the filament terminating on the same side, i.e., top or bottom as viewed in FIG. 4, of pocket C as it begins on pocket A. Therefore, when it gets to pocket A the second time around as illustrated by D, it would begin at the opposed side of that pocket. Thus, for example, if pocket D is considered a repeat of pocket A, then filament 50 would begin pocket A at the line indicated as 51 immediately to the left of pocket A. Thus, for an odd number of pockets, the lines on repeated passes would be the same for a single filament as are illustrated for dual filaments on a single pass for even numbers of pockets. Windings such as those illustrated which pass the filament entirely around the pocket before proceeding to the next pocket will result in a substantially thicker walled pocket than the crossover point, resulting in a cage resembling that illustrated in FIG. 1. Windings which do not pass entirely around a pocket before crossing to the next pocket, but rather sinuously wrap the pockets, will result in a heavier crossover portion. It is preferred that the windings passing from one pocket to the other always cross over to a different side. Thus, for example, as illustrated, windings which terminate on the top as viewed in FIG. 4 of one pocket will pass over to the bottom of the next pocket. Further, in order to reduce the radial thickness of the crossover portion, a winding which terminates at the circumferentially outer portions of one pocket should cross over to the circumferentially inner portions of the next pocket, and vice-versa. This results in a radially smaller crossover portion. Smaller or thinner crossover portions assure that the crossover portion of the cage will never interfere with the operation of the assembly by contacting either of the race rings.

After wrapping the second material to form the cage, the cage is subjected to a bonding operation to fix the cage in fixed ring and pocket shape.

It can therefore be seen from the above that my invention provides for a filament wound bearing cage constructed of two separate filament materials, one of which is used to line the individual pockets and the other of which is used to form the cage into ring shape. Also shown and described are method of forming the cage.

Although the teachings of my invention have herein been discussed with reference to specific theories and embodiments and although illustrative means for accomplishing explained results have been described, it is to be understood that these are by way of illustration only and that others may wish to utilize my invention in different designs or applications.

I claim as my invention:

1. In a filament wound bearing cage having a plurality of circumferentially spaced anti-friction element receiving pockets with radially inner and outer open ends and radially continuous walls defining the pockets with a plurality of superimposed filaments wound to define the pockets and crossover portions between the pockets connecting adjacent pockets to one another in fixed ring shape, the improvement of: a first filament material defining a portion of the pocket walls around the inner periphery of the pocket, and a second different filament material interconnecting the pockets and forming the pockets into fixed ring and pocket shape.

2. The method of making a bearing cage composed of a ring of circumferentially spaced closed annular pockets, each with radially spaced open inner and outer peripheral ends connected by a continuous radial wall and connecting portions between the pockets holding the pockets in ring-defining relation which comprises: winding a first material filament a plurality of times in a manner to provide a pluality of superimposed filament portions defining each individual pocket, winding a second material filament a plurality of times to provide superimposed filament portions connecting the pockets formed by the first filament material portion together in circumferentially spaced-apart ring formation, the second different material filament forming the connecting portions and bonding the superimposed filament portions together into fixed ring and pocket shape.

3. The method of claim 2 wherein the first material filament is wound to provide a portion of the walls of each pocket in the manner of a band whose inner surface defines the pocket, and the second filament is wound to encompass the outer surface of said bands and to connect the bands circumferentially together in spaced-apart relation.

4. The method of claim 3 wherein the second material filament is wound to also provide a portion of each pocket's defining wall radially beyond the bands formed by the winding of the first material filament.

5. A filament wound bearing cage having a plurality of circumferentially spaced-apart roller element receiving pockets defined by wound filament portions and connecting portions circumferentially between the pockets connecting the defined pockets to one another in a ring shape, a portion of each pocket defined by a first filament wound to provide a band around the pocket, the band having open radially inner and outer ends and a continuous radial wall intermediate the ends, the radial wall defining a portion of the pocket on its inner surface, the bands being received in a ring defined by a second different material filament wound around each of the bands and between each adjacent band into a wound ring of circumferentially spaced pockets, the filaments being bonded together into fixed ring and pocket shape.

6. The apparatus of claim 5 wherein each of the bands has a height and a thickness greater than the individual filament.

7. The apparatus of claim 6 wherein each of the bands is circumferentially spaced from an adjacent band by a connecting portion composed of a plurality of windings of the second material filament.

8. The apparatus of claim 7 wherein the second material filament overlies the radial ends of the bands and has a portion defining a portion of each individual pocket radially beyond the ends of the bands.

9. An anti-friction element cage for bearings comprising: a ring of circumferentially spaced closed annular pockets with radially spaced inner and outer peripheral ends and a continuous radial wall extending between said ends and portions between the pockets joining the pockets into the ring, a cage being formed of a flexible filament wound to provide a plurality of superimposed filament portions forming the portions between the pockets, and each of the pockets having a band therearound with an inner surface defining a portion of the pocket, the band composed of a pluality of windings of a second different material filament, and the filaments bound together in fixed ring and pocket shape.

10. An anti-friction element receiving cage for bearings comprising a cage member having a plurality of circumferentially spaced-apart pockets for receipt of the roller elements, each of said pockets having cavity defining walls with open radially inner and outer ends, each of said pockets having at least a portion of said walls defined by filament wound a plurality of times therearound providing an inner surface defining a portion of said walls, the filament windings being bonded together and the filament being a material different than the remainder of the cage.

11. A method of manufacturing a filament-wound bearing cage constructed of differing materials which comprises the steps of providing a fixture with members thereon having an outer surface defining a pocket shape for receipt of an anti-friction element, winding a filament around said member to define a pocket having a hollow interior, and winding a separate and different material filament around a plurality of the defined pockets, fixing the defined pockets in circumferential spaced relation and with open radially inner and outer ends and thereafter bonding the filaments into fixed ring and pocket shape.

* * * * *